Figure 7:
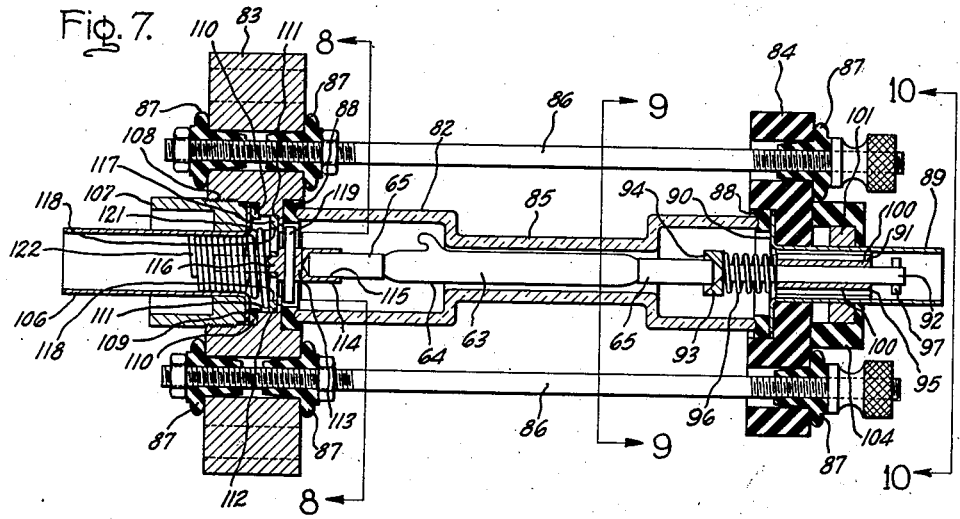

Sept. 8, 1942.  E. B. NOEL  2,295,046
COOLING APPARATUS FOR ELECTRIC LAMPS
Filed Aug. 3, 1940  3 Sheets-Sheet 1
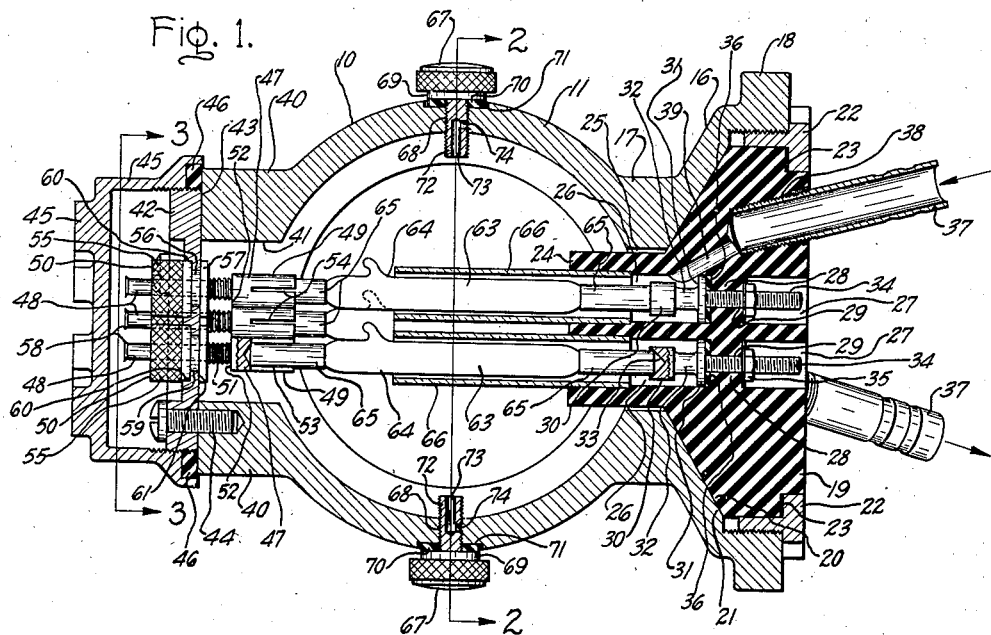
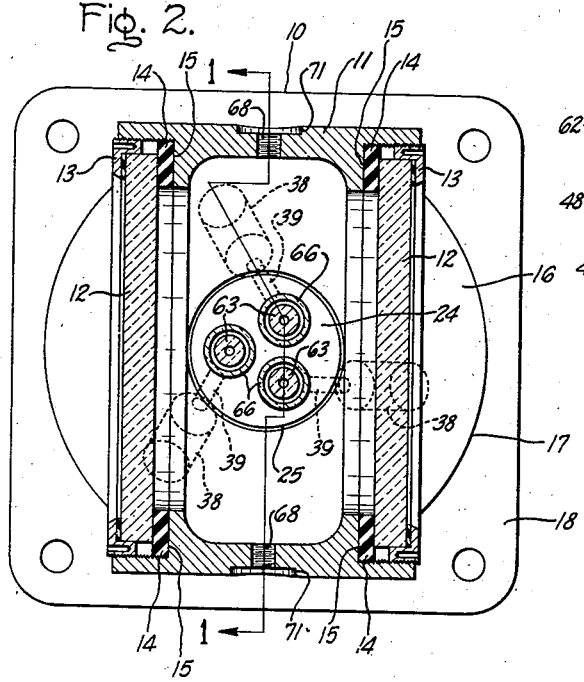
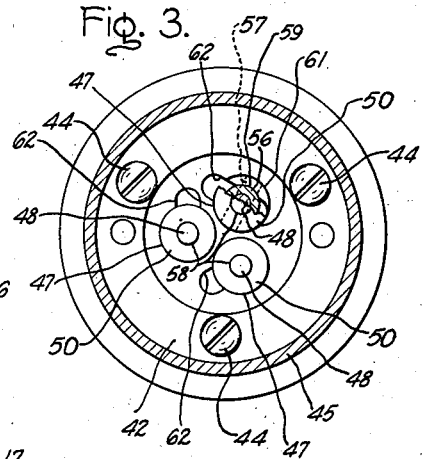
Inventor:
Edward B. Noel,
by John H Anderson
His Attorney.

Sept. 8, 1942.   E. B. NOEL   2,295,046
COOLING APPARATUS FOR ELECTRIC LAMPS
Filed Aug. 3, 1940   3 Sheets-Sheet 2
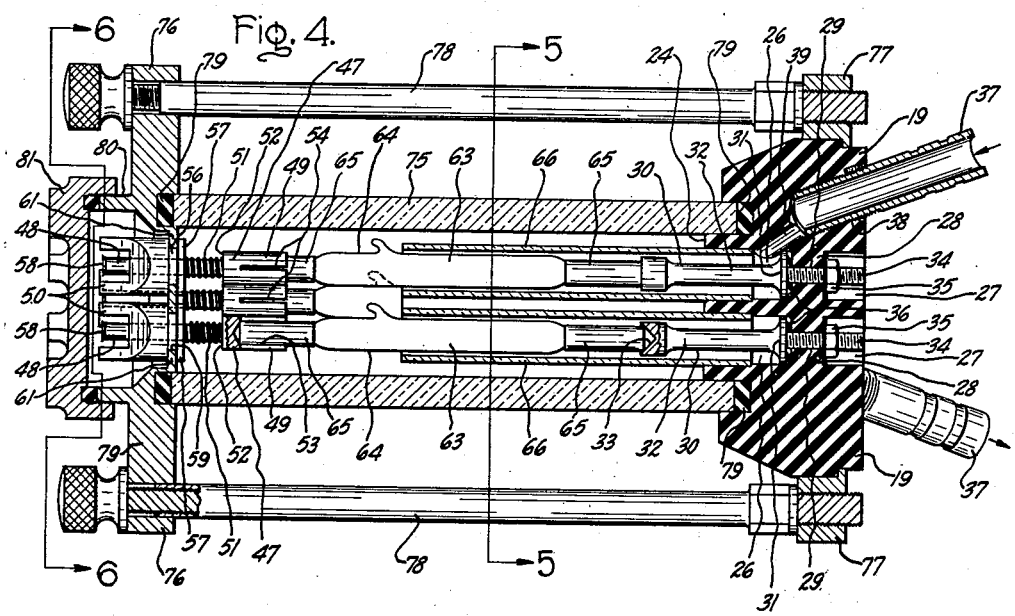
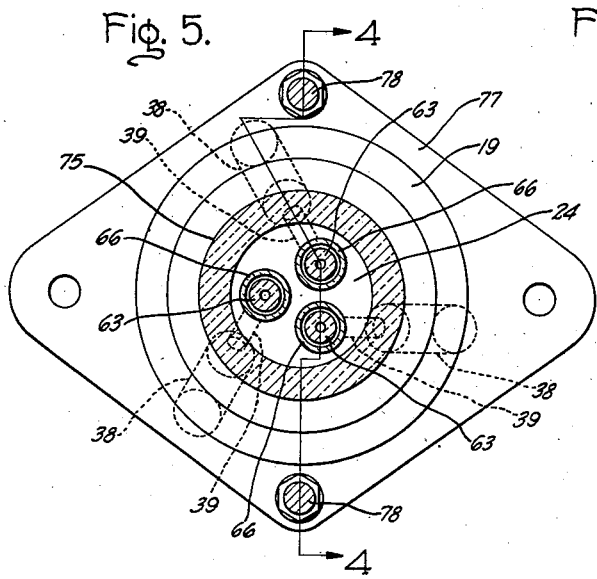
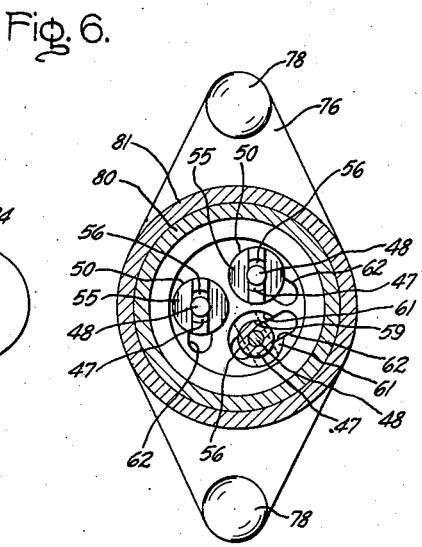
Inventor:
Edward B. Noel,
by John H Anderson
His Attorney.

Sept. 8, 1942.  E. B. NOEL  2,295,046
COOLING APPARATUS FOR ELECTRIC LAMPS
Filed Aug. 3, 1940  3 Sheets-Sheet 3

Inventor:
Edward B. Noel,
by John H Anderson
His Attorney.

Patented Sept. 8, 1942

2,295,046

UNITED STATES PATENT OFFICE 2,295,046

COOLING APPARATUS FOR ELECTRIC LAMPS

Edward B. Noel, Cleveland Heights, Ohio, assignor to General Electric Company, a corporation of New York Application August 3, 1940, Serial No. 350,471

6 Claims. (Cl. 240—11.4)

My invention relates in general to high intensity light sources particularly of the small high pressure mercury arc type such as disclosed and claimed in U. S. Patent No. 2,094,694, Cornelis Bol et al., issued October 5, 1937, and assigned to the assignee of the present invention. More particularly, my invention relates to a water cooling arrangement or jacket for such high pressure mercury arc lamps.

High pressure mercury vapor lamps of the type referred to above are provided with relatively small quartz tubes of the order of 40 mm. or so in length and having an outside diameter of about 6 mm. and a bore of about 2 mm. In lamps of such small volume operating with relatively high power inputs of the order of 800 to 1000 watts and above, it is necessary to effectively cool the lamp in order to dissipate the relatively large energy input within the small bulb volume and prevent softening of the lamp bulb. It is not sufficient merely to place the lamp in a bath of water. Instead, the water must be passed over the lamp with enough velocity to prevent the formation of steam bubbles on the surface of the quartz bulb. Steam bubbles do not conduct away the heat fast enough to prevent over-heating of the lamp, so that their presence may result in the early failure of the lamp.

The water-cooling arrangements heretofore in use with lamps of the above mentioned type have been more or less unsatisfactory mainly for the reason that the lamps were not easily replaceable or, in the case of multiple units, a close grouping of the several lamps to thereby form a small compact light source was impossible. In these prior constructions, one or both leads of the lamp were insulated from the cooling water in order to prevent any short-circuiting of the current flow through the cooling water with consequent interference to lamp operation. In designs in which both leads were insulated from the water, the leads were sealed in an insulating compound which made it necessary to discard the entire jacket along with the lamp when the latter failed. While considerable simplification and improvement resulted when only one lead to the lamp was insulated from the cooling water, inasmuch as with such a construction it was possible to make the jacket a permanent part of the installation with only the lamp proper as the renewable element, still such a construction rendered impossible a close grouping of several lamps to form a small and compact light source.

One object of my invention is to provide an improved water-cooling arrangement for small electric lamps which is simple in construction and effective in operation.

Another object of my invention is to provide a water-cooling arrangement for small electric lamps which will permit easy replacement of the lamp upon failure of the same.

Still another object of my invention is to provide a water-cooling arrangement for a plurality of small electric lamps which will permit a close grouping of the several lamps so as to provide a small and compact light source and which will also permit easy replacement of the individual lamps.

An important feature of my invention is the use of a separate light-transmitting velocity tube for each lamp and closely surrounding the same so as to restrict the cross-sectional area of the path of the cooling water along the length of the lamp and thereby maintain the electrical conductivity of the water between the two ends of the lamp at a value sufficiently low to permit exposure of both lamp leads to the cooling water without interfering with the proper operation of the lamp.

Figure 8:
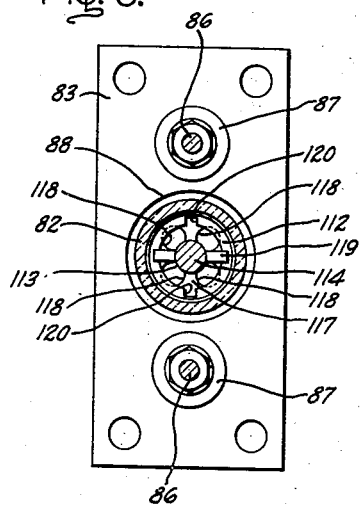
Figure 9:
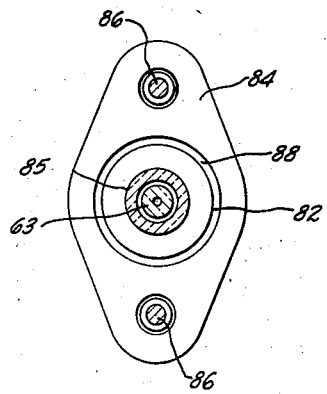
Figure 10:
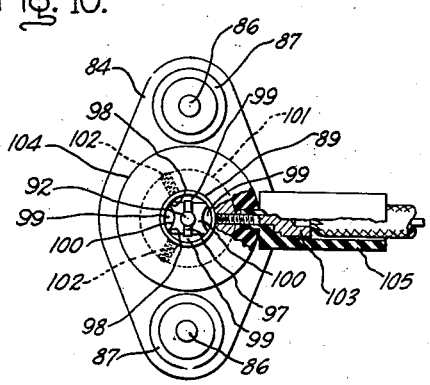

Further objects and advantages of my invention will appear from the following description of species thereof and from the accompanying drawings in which:

Fig. 1 is a longitudinal section on the line 1—1 of Fig. 2 of a water-cooled multiple mounting arrangement comprising my invention; Figs. 2 and 3 are transverse sections on the lines 2—2 and 3—3 respectively of Fig. 1; Fig. 4 is a longitudinal section on the line 4—4 of Fig. 5 of a modified form of water-cooled multiple mounting arrangement according to my invention; Figs. 5 and 6 are transverse sections taken on the lines 5—5 and 6—6 respectively of Fig. 4; Fig. 7 is a longitudinal section of a water-cooled single mounting arrangement according to my invention; Figs. 8 and 9 are transverse sections taken on the lines 8—8 and 9—9 respectively of Fig. 7; and Fig. 10 is an end view of the device shown in Fig. 7 as indicated by the line 10—10 in Fig. 7.

Referring to the drawings, the device shown in Figs. 1–3 comprises a metal housing or jacket 10, preferably of brass, having a cylindrical open-ended hollow central portion 11 the ends of which are closed by flat light-transmitting circular glass windows 12. The said windows are held in water tight relation to the cylindrical portion 11 of the housing by means of retainer rings 13 which thread into the cylindrical portion 11 of the housing and force the windows 12 against gaskets 14 of suitable material, such as rubber, and the said gaskets against seating surfaces 15 formed in the cylindrical housing portion 11.

One end of the housing or jacket 10 is provided with a hollow base portion 16 extending from the side wall of the cylindrical portion 11 and comprising a circular portion 17, the axis of which extends at right angles to and intersects the axis of the cylindrical portion 11, and a flange portion 18 preferably of square configuration. Mounted within the base portion 16 is a circular insulator member 19 of suitable material having relatively high dielectric strength and thermal resistivity, preferably a ceramic material commercially known as "Isolantite." The insulator 19 is provided with a conical bearing portion 20 which is tightly pressed against a corresponding conical seat 21 in the circular housing portion 17 by means of a clamping or retainer ring 22 which threads into the flange 18. To insure a water-tight seal between the insulator 19 and the adjacent metal parts, a suitable gasket 23 is inserted between the insulator and the clamping ring 22.

At its inner end, the insulator 19 is provided with a coaxial cylindrical extension 24 of reduced diameter which extends through a circular opening 25 concentrically located in the circular housing portion 17. The said extension 24 and the insulator proper 19 are formed with three closely arranged circular inner and outer chambers 26 and 27 respectively disposed in triangular coaligned formation about the coinciding axes of the cylindrical extension 24 and the insulator proper 19, each of the coaligned chambers 26 and 27 being divided by a transverse partition 28 provided with a coaxial opening 29 of reduced diameter extending therethrough. Disposed within each of the coaligned chambers 26 and 27 is a stationary lamp contact member 30 preferably of brass and comprising a relatively thin circular flange 31 of a diameter such that it will just fit within the inner chamber 26, an inwardly extending lamp socket post 32 of reduced size having a conical seat or socket 33 in its inner end for the reception of the lamp terminal, as shown in Fig. 1, and an outwardly extending screw-threaded post portion 34 extending through the opening 29 in the partition 28 into the outer chamber 27. Each of the said lamp contact members 30 is secured within its respective chamber 26 by means of a nut 35 which threads onto the threaded post portion 34 of the contact member and tightly clamps the flange 31 thereof against a suitable gasket 36 and the latter against the partition 28 to thereby provide a water-tight seal between the lamp contact member 30 and the insulator 19.

Projecting outwardly from the outer end of the insulator 19 are three brass nipples 37, one for each chamber 26, for connection to water-circulating hoses (not shown). The said nipples are threaded into recesses 38 in the insulator 19 and are arranged in triangular formation about the axis of the insulator and in relatively close relation to their respective inner chambers 26 with which they communicate by means of connecting passageways 39.

Extending from the side wall of the cylindrical lamp-housing portion 11 at a point diametrically opposite the base portion 16, is a cylindrical extension 40 having a circular opening 41 extending therethrough. The outer end of said extension 40 is closed by a circular end plate 42, preferably of brass and resting against the flat end surface 43 of the extension 40 and secured thereto by means of screws 44. The outer periphery of the end plate 42 is threaded for engagement with a hollow cup-shaped closure cap 45, preferably of brass, which is screwed onto the said end plate and compresses a rubber gasket 46 inserted between the said cap and the flat end surface 43 of the extension 40 to thereby provide a water-tight seal between the cap and the jacket 10.

Mounted on the end plate 42 and extending therethrough in coalignment with the three stationary lamp contacts 30, are three resilient lamp contacts 47 each comprising a cylindrical plunger 48, preferably of stainless steel and having at its inner end a cylindrical lamp socket portion 49 of larger diameter, a mounting knob 50 preferably of brass and slidably mounted on said plunger, and a stainless steel helical compression spring 51 concentrically mounted on the plunger 48 between the knob 50 and the shoulder 52 formed on the plunger by the enlarged socket portion 49. The socket portion 49 of the plunger 48 is provided with a concentric bore 53 (Fig. 1) for the reception of the lamp terminal. To provide a secure grip on the lamp terminal, the wall of the socket portion 49 is provided with a number of longitudinally extending uniformly spaced slots 54, preferably four in number and extending back from the open end of the socket. In this manner, the socket is formed of a number of spring fingers which are adapted to tightly grip the lamp terminal. The mounting knob 50 comprises an outer cylindrical knurled head portion 55, an intermediate cylindrical portion 56 of reduced diameter, and a transversely extending inner wing or locking lug portion 57 the transverse extent of which preferably coincides with the diameter of the knurled head portion 55. The mounting knob is provided with a concentric opening through which the plunger 48 extends, the opening being large enough to permit easy sliding of the knob on the plunger. The mounting knob is retained on the plunger by means of a head 58 at the outer end thereof formed by peening over the said end after the spring 51 and mounting knob 50 have been assembled on the plunger.

For the purpose of mounting the three resilient lamp contacts 47 on the end plate 42, the latter is provided with three openings 59 extending therethrough and disposed in coalignment with the stationary lamp contacts 30. The said openings 59 are of a diameter slightly larger than that of the reduced intermediate portions 56 of the mounting knobs 50, and are countersunk at their outer ends, as indicated at 60, so as to provide shelves or seats 61 of a thickness such that they will enter the space between the knurled head portion 55 and the transverse locking lug 57 of the mounting knobs 50. The countersunk portions 60 are of a diameter such as to permit reception therein of the knurled head portion 55 of the mounting knob 50. The shelf 61 bordering each opening 59 is provided with an elongated diametrical slot 62 of a length and width sufficient to permit free passage of the locking lug 57 therethrough. The elongated slots 62 are preferably arranged with their lengths at right angles to the radial lines extending from the center of the circular end plate 42 and intersecting the centers of the respective openings 59. To permit free passage of the circulating water through the end plate 42, the diametrical slots 62 are extended, at one end thereof, a short distance beyond the countersunk portions 60 to thereby provide passage-ways between the hollow interior of the central lamp-housing portion 11 and the hollow space within the end closure cap 45 when the resilient contacts 47 are mounted in place on the end plate 42.

Mounted within the central portion 11 of the jacket 10 are three high-pressure mercury vapor lamps 63 of the capillary type, such as described and claimed in the aforesaid Bol et al. Patent No. 2,094,694, and comprising a cylindrical quartz bulb 64 having a cylindrical metal terminal 65 at each end. The said terminals 65 of each lamp are mounted between corresponding stationary and resilient sockets 33 and 49 respectively, the said sockets being so located as to longitudinally position the lamps substantially centrally within the central light-transmitting portion 11 of the jacket. In addition, the sockets 33 and 49 are so arranged longitudinally with respect to each other as to cause a slight compression of the spring 51 on the resilient contact 47 when a lamp 63 is inserted between such sockets. In this manner a good electrical connection is insured at all times between the socket 33 and the co-operating lamp terminal, as well as between the opposite lamp terminal and the jacket itself through the socket 49, plunger and spring 48 and 51 respectively and the mounting knob 50.

To insert the lamps 63 in the jacket 10, one end of a lamp is inserted in the socket 49 of one of the resilient contacts 47, the spring fingers of the socket 49 securely holding the lamp therein. The lamp, with its attached contact 47, is then introduced into the jacket through one of the openings 59 in the end plate 42 until the innermost end of the lamp is received in and engages the conical seat 33 in the corresponding stationary contact 30 at the insulated end of the jacket 10. Thereafter, the mounting knob 50 on the resilient contact 47 is further moved inwardly, against the resistance of spring 51, until the locking lug 57 enters the elongated slot 62 in the end plate 42, after which the knob 50 is turned one way or the other so as to lock the lug 57 against the underside of the shelves 61, as shown in Fig. 3.

Placed concentrically around each of the lamps 63 is a velocity tube 66 of suitable light transmitting material, such as glass. The said tubes 66 extend into the inner chambers 26 in the insulator block 19 and fit closely therewithin so as to be rigidly supported from the insulator block. In addition, the close fit of the tubes 66 in the chambers 26 compels the circulating water entering and leaving the jacket 10 through the nipples 37 to flow through the said tubes 66. The inner diameter of the tubes 66 is such as to provide a small radial clearance from the lamp of about 1 mm. or thereabouts through which the water must flow. Because of this restricted cross-section of the circulating water, the electrical conductivity thereof between the exposed lamp terminals 65 is kept at a relatively low value, sufficiently low to prevent any material interference with the proper operation of the lamp. Thus I have found that where a 1000 watt lamp is enclosed by a velocity tube 66 providing an annular space of about 1 mm. around the lamp, the current through the cooling water is only about 10 to 25 milliamperes. The use of the velocity tubes 66 thus permits the exposure of both terminals 65 of each lamp to the cooling water. This in turn permits the several lamps 63 to be mounted in relatively close relation to each other, much more so than in the case of previous water-cooling arrangements, thus producing a small, compact, high-intensity light source, such as required for many applications, including search-lights, airport beacons, and photo-engraving and photo-lithography.

The velocity tubes 66 further serve to impart a relatively high velocity to the cooling water. Because of the restricted annular cross-section of the cooling water, more than ample water velocity is attained to prevent the undesirable formation of steam bubbles with a water flow of about three liters per minute. Thus, with an annular passage about one millimeter wide around the lamp, a flow of approximately three liters per minute gives ample velocity and a temperature rise less than 3° C. The use of the velocity tubes 66 thus has made it possible to reduce the amount of cooling water over that heretofore necessary to effectively cool the lamps, because it is not the amount of water, but merely the surface velocity over the lamp that matters. The criterion for proper cooling is that the speed of flow should be great enough to prevent the formation of any steam bubbles.

In accordance with the invention described and claimed in copending U. S. application Serial No. 174,860, Van Alphen et al., filed November 16, 1937 and assigned to the assignee of the present invention, which issued as Patent No. 2,223,470, Dec. 3, 1940, the velocity tubes 66 are made of an ultra-violet absorbing material, preferably a lead-bearing hard glass such as that commercially known as "Nonex." As a consequence, the velocity tubes 66 additionally serve as ultra-violet filters for absorbing the ultra-violet radiations from the lamps 63. In this manner, the absorption by each lamp of the ultra-violet radiations from the adjacent lamps is entirely prevented. This is an important consideration, inasmuch as such an absorption by the lamps themselves of the ultra-violet radiations of the adjacent lamps would cause an increase in the pressure and temperature of each lamp, with consequent short life thereof.

To permit expulsion of trapped air within the jacket 10 when it is filled with cooling water and during the circulation of the same, the jacket is provided with a pair of valves comprising cap screws 67 threaded into diametrically opposite holes 68 in the cylindrical wall of the central lamp-housing portion 11 of the jacket. Each of the cap screws 67 is provided with a concentric boss 69 on the underside of the screw head which compresses a rubber gasket 70 fitting in a recess 71 in the jacket so as to provide a water-tight seal when the valve is screwed down tight. The threaded stud portion 72 of the valve is provided with a longitudinal bore 73 and a transverse passage 74 which connects the interior of the jacket with the atmosphere when the valve is unscrewed, thus permitting the escape of any trapped air. Inasmuch as the lamps 63 are adapted to be operated in a horizontal position, the valves 67 are so located in the jacket portion 11 that one or the other will always be at the top of the device at the point where trapped air will collect. Thus, as shown in Fig. 1, the valves 67 are located diametrically opposite one another and in a line normal to the longitudinal axis of the lamps 63.

In operation, one of the circulating water nipples 37 is connected to an intake hose (not shown), while the other two nipples are connected to outlet hoses (not shown). Electrical connections to the lamps 63 are made at one end to the threaded studs 34 on the stationary contacts 30, and at the other end to the casing of the jacket itself which is electrically connected, through the end plate 42, to the resilient lamp contacts 47. After the flow of water has begun through the jacket, the electrical circuit through the lamps 63 may then be closed so as to start the operation thereof.

An important feature of the arrangement described above is the easy interchangeability of the individual lamps. Thus, when any lamp fails, it is merely necessary to unscrew the closure cap 45 and remove the defective lamp from the jacket by grasping the knurled head 55 of the resilient contact 47 in which the defective lamp is held, turning the same until the transverse locking bar 57 comes opposite the elongated slot 62 in the end plate 42, and then withdrawing the said contact 47 together with the attached defective lamp which is securely held in the sockekt 49 of the contact by the spring fingers thereof. A new lamp may then be inserted in the socket 47 and introduced into the jacket as described hereinbefore, the resilient contact 45 being again locked in position in the end plate 42 and the closure cap 45 replaced.

The modification illustrated in Figs. 3, 4 and 5 differs from the form shown in Figs. 1, 2 and 3 mainly in that the metal jacket 10 is replaced by a heavy cylindrical light-transmitting glass tube 75 which surrounds the three lamps 63, the ends of the tube being clamped between a brass end plate 76 and the insulator 19, the latter being supported in a second brass end plate 77. The two brass end plates 76 and 77 are held together by retaining bolts 78 located exteriorly of the glass tube 75, and rubber gaskets 79 are inserted between the end of the glass tube and the end plate 76, and between the opposite end of the glass tube and the insulator 19, to thereby provide a water-tight seal therebetween. The central portion of end plate 76 is of the same construction as the central portion of end plate 42 in Figs. 1-3. The said plate 76 is provided with a centrally located outwardly projecting annular flange 80 threaded on its outer periphery for engagement with a closure cap 81 similar to the cap 45 in the first form of the invention described hereinabove.

Figs. 7, 8 and 9 disclose a single-lamp water-cooled unit according to the invention which is designed for those applications where a large volume of ultra-violet energy of all wave-lengths is required, particularly from a source having high concentration. This modification of the invention is similar to that disclosed in Figs. 4-6 in that it comprises a glass tube 82 surrounding the lamp 63 and clamped between two end members comprising a brass end plate 83 and an insulator end member 84 preferably of linen "Textolite." However, it differs mainly in that the glass tube 82, in addition to serving as the jacket for the circulating water, also serves as the velocity tube for imparting high velocity to the circulating water as it passes over the lamp. For this purpose, the glass tube 82 is provided with a central portion 85 of reduced diameter which closely surrounds, and extends along the greater part of the length of the lamp 63. This constricted portion 85 thus serves as the velocity tube in the same manner as the velocity tubes 66 in the previous forms of the invention.

The brass end plate 83 and the insulator 84 are held together by retaining bolts 86 which are insulated from the plate 83 and spaced from the insulator 84 by suitable rubber bushings 87. Rubber gaskets 88 are inserted between the ends of the glass tube 85, and the end members 83 and 84 to provide a water-tight seal therebetween.

Centrally mounted within the insulator 84 is a cylindrical brass intake tube 89 having an outwardly extending flange 90 at its inner end which is clamped between gasket 88 and the insulator 84 to thereby secure the intake tube in place in the insulator and to provide a water-tight connection between the said intake tube and the glass tube 82 surrounding the lamp.

Secured within and extending inwardly from the intake tube 89 is a resilient lamp contact 91 comprising a brass plunger 92 having at its innermost end a head 93 provided with a conical seat or socket 94 in which the lamp terminal 65 is received. Said contact 91 further comprises a brass sleeve 95 secured to the intake tube 89 and through which the plunger 92 slidably extends, and a stainless steel helical compression spring 96 concentrically mounted on the plunger 92 between the head 93 thereof and the sleeve 95. At its outer end, the plunger 92 is provided with a transversely extending stop pin 97 which abuts against the outer end of sleeve 95 to thereby lock the plunger within the sleeve. As shown particularly in Fig. 10, the sleeve 10 is made from a bar of rectangular cross-section the corners of which are ground flat, as indicated at 98, so as to fit tightly against the inner wall of the intake tube 89. To insure that the sleeve is positively secured to the intake tube 89, the corners 98 of the sleeve are preferably soldered to the said tube. The spaces 99 between the sides of the sleeve 95 and the surrounding intake tube 89 provide ample passageways for the flow of the cooling water into the glass tube 85 surrounding the lamp, the narrower sides 100 preferably being formed concave, as shown in Fig. 10, to increase the cross-section of the spaces between such sides and the intake tube.

Electrical connection to the resilient contact 91 is made through a brass connector ring 101 secured to the sleeve 95 by set screws 102 (Fig. 10), and a brass terminal connector 103 threaded into said connector ring. To prevent any possibility of electrical shock, the connector ring is enclosed in an insulating cap 104, and the terminal connector encased in an insulating bushing 105. The cap 104 is secured to the connector ring 101, and the bushing 105 to the cap 104, by means of the threaded terminal conductor 103. The exposed portion of the intake tube 89 extending out beyond the cap 104 is enclosed by the rubber water-inlet tube (not shown) during operation of the device, thus completing the insulation of all the metal parts at the intake end of the device.

The brass end plate 83 at the outlet end of the device is provided with a brass outlet tube 106 extending outwardly therefrom and secured thereto by a knurled brass collar 107 which threads into a centrally located recess 108 in the end plate and clamps an outwardly turned flange 109 formed on the inner end of said tube against an annular shoulder 110 formed in the recess 108 by a reduced diameter portion 111 thereof. Rubber gaskets 112 are inserted between the flange 109 and the shoulder 110 to provide a water-tight connection between the outlet tube 106 and the end plate 83.

At the inner end of the reduced portion 111 of recess 108, the end plate 83 is formed with an inturned annular flange 112 (Fig. 8) on which flange a stationary lamp contact 113 is mounted.

The said contact 113 comprises a brass stem 114 having a longitudinally slotted socket portion 115 at its inner end and a stud portion 116 of reduced diameter extending outwardly from the socket portion 115. Secured on said stud portion 116 by a press fit and resting against the socket portion 115 is a perforated socket mounting disc 117. The said disc seats on the annular flange 112 in the reduced portion 111 of recess 108, and is provided with a plurality of circular openings 118, preferably four in number and arranged in a circle about the socket 115. The said openings provide passageways between the glass tube 82 and the outlet tube 106 through which the cooling water or liquid can pass. The socket portion 115 of the stationary contact 113 is provided with a transverse locking bar or lug 119 which is spaced inwardly from the disc 117 a distance slightly greater than the thickness of the annular flange 112 so that the latter can enter the space between the said lug and the disc 117. As shown particularly in Fig. 8, the annular flange 112 is provided with diametrically opposite notches 120 through which the locking lug 119 is inserted during the mounting of the stationary contact 113 on the end plate 83.

To assemble the lamp 63 within the device shown in Figs. 7 to 10, the slotted socket 115 of the stationary contact 113 is first placed over one of the lamp end terminals 65 after which the lamp is introduced into the glass tube 82, with the free end terminal 65 first, so that the latter engages the socket 94 in the resilient lamp contact 91 at the intake end of the device. Then with the locking lug 119 in alignment with the notches 120 in the annular flange 112, the lamp and its attached contact 113 are moved inwardly a still further amount against the resistance of the compression spring 96 of the resilient contact 91 until the locking lug passes through the said notches 120, after which the stationary contact is rotated a slight amount one way or the other, preferably 90° or thereabouts, so that the locking lug underlies the annular flange 112, as shown in Fig. 8, and is pressed thereagainst by the recoiling action of spring 96. The flanged end of the outlet tube 106 is then inserted in the recess 108 in the end plate 83 and the brass collar 107 screwed into the said end plate down against the flange 109 of the outlet tube so as to securely fasten the latter to the end plate and complete the assembly.

To insure a good electrical connection at all times between the stationary lamp contact 113 and the brass end plate 83, the inner end of the outlet tube 106 is provided with a truncated conical helical compression spring 121 of stainless steel extending inwardly from the said tube 106 and engaging the disc 117 of the stationary contact 113. At its outer end, the spring 121 is provided with a cylindrical closed-wound portion 122 which extends into the outlet tube 106 and tightly fits within the same so as to be securely held therein. When the collar 107 is screwed into place in the end plate 83 so as to secure the outlet tube 106 thereto, the conical spring 121 engages the disc 117 and is compressed by the inward movement of the outlet tube 106. The compressive force of spring 121 being greater than that of the spring 96 in the resilient contact 91, the disc 117 is forced against the annular flange 112 with considerable pressure. The result is that a good contact is provided between the stationary contact 113 and the brass end plate 83 at all times.

Inasmuch as the modification illustrated in Figs. 7 to 10 is for a single lamp only, there is no need for absorbing the ultra-violet radiations of the lamp to prevent their absorption by adjacent lamps. Consequently, the glass jacket or tube 82 can be made of a material which will transmit any desired radiations, for instance quartz, which will transmit the ultra-violet radiations of the lamp 63. Thus, the device may be especially adapted for use where a large volume of ultra-violet energy of all wave-lengths is required.

Because all mechanical strain is taken by the retaining bolts 86, there is no danger of the glass jacket 82 being cracked even though it be transformed into a strained condition by the adverse effect thereon of the ultra-violet radiations of the lamp.

What I claim as new and desire to secure by Letters Patent of the United States is:

1. A liquid-cooled mounting device for a plurality of high intensity tubular metal-vapor lamps of the capillary type comprising a jacket at least a portion of which is light-transmitting and through which the cooling liquid is adapted to be circulated, a plurality of pairs of opposed sockets for the lamps both in direct contact with the cooling liquid and arranged to mount the lamps in relatively close parallel relation to one another at a position opposite the said light-transmitting portion of said jacket, and a plurality of light-transmitting velocity tubes, one for each lamp, closely surrounding said lamps for the greater part of their lengths and through which the cooling liquid is circulated in one direction only, said velocity tubes being made of ultra-violet absorbing material and serving to confine at least the greater part of the cooling liquid column between each pair of opposed sockets to a relatively small cross-section and to impart a relatively high velocity to the cooling liquid flowing therethrough, the said cross-section of the said liquid column being sufficiently small to lower the electrical conductivity of the said column to a harmless value.

2. A liquid-cooled mounting device for a high intensity tubular electric lamp having opposite end terminals, said device comprising a jacket at least a portion of which is light-transmitting and having an intake and an outlet connection for the cooling liquid, a pair of opposed sockets for the lamp arranged to mount the lamp opposite the light-transmitting portion of said jacket with both the end terminals of said lamp in electrical contact with the cooling liquid, and a light-transmitting velocity tube closely surrounding the lamp for the greater part of its length between the end terminals thereof and having one end in direct communication with said intake connection so as to segregate all the cooling liquid at the intake end of said velocity tube from all the cooling liquid at the outlet end of said velocity tube, said velocity tube confining the cross-section of at least the greater part of the cooling liquid column between the opposite ends of the lamp to an area of sufficiently small cross-section to lower the electrical conducitivity of the said liquid column to a harmless value.

3. A liquid-cooled mounting device for a plurality of high intensity tubular electric lamps of the capillary type having opposite end terminals, said device comprising a jacket at least a portion of which is light-transmitting and having an intake and an outlet connection for the cooling liquid, a plurality of pairs of opposed sockets for the lamps arranged to mount the lamps opposite the said light-transmitting portion of said jacket with both the end terminals of each of said lamps in electrical contact with the cooling liquid, and a plurality of light-transmitting velocity tubes, one for each of said lamps, closely surrounding said lamps for the greater part of their lengths and arranged to segregate the cooling liquid at the intake end of each of said tubes from the cooling liquid at the outlet end of each of said tubes, said velocity tubes serving to confine the cross-section of at least the greater part of the cooling liquid column between the opposite ends of said lamps to an area of sufficiently small cross-section to lower the electrical conductivity of the said liquid column to a harmless value.

4. A liquid-cooled mounting device for a high intensity tubular electric lamp having opposite end terminals, said device comprising a jacket having an intake and an outlet connection for the cooling liquid, a pair of opposed lamp sockets within said jacket for supporting the lamp with the end terminals thereof both in electrical contact with the cooling liquid, and velocity tube means closely surrounding the lamp for confining the cross section of the cooling liquid path between the opposite ends of the lamp to an area of sufficiently small cross-section to lower the electrical conductivity of the said liquid column to a harmless value.

5. A liquid-cooled mounting device for a high intensity tubular electric lamp having opposite end terminals, said device comprising an outer jacket member open at its opposite ends, an insulator secured to and closing the opening at one end of said jacket member, said insulator having a passageway for the flow of a cooling liquid therethrough into said jacket member, a metal end plate secured to the other end of said jacket member, a fixed lamp socket mounted on said insulator and disposed within said jacket member, and a removable lamp socket mounted on said end plate in a position opposite the said fixed socket, said removable socket being provided with means for positively gripping the lamp so as to form a single unit therewith during the insertion of the said lamp and removable socket into said device and their removal therefrom.

6. A liquid-cooling mounting for tubular electric lamps having current supply terminals at their ends comprising a jacket having openings at opposite ends thereof, an insulating plug member filling the opening at one end of said jacket, said plug member having a plurality of bores in alignment with the opening at the opposite end of the jacket, a contact and support member in each of said bores extending to the exterior of said plug, a support and cover plate member over the opening at the said opposite end of the jacket, a plurality of contact and support members each in alignment with one of said first-mentioned contact and support members to hold a lamp therebetween, means on each of said second-mentioned contact and support members removably engaged in an opening in said cover plate member through which the associated contact member and lamp may be withdrawn, said second-mentioned contact members being arranged to grip their associated lamps to effect such withdrawal, a cap member covering said cover plate and associated contact and support members, a velocity tube extending from each of the bores in said plug member to closely surround the associated lamp, and a passage for liquid extending through said plug member from each of said bores.

EDWARD B. NOEL.